United States Patent
Agarwal et al.

(10) Patent No.: US 10,750,452 B2
(45) Date of Patent: Aug. 18, 2020

(54) ULTRALOW-POWER SENSOR HUBS

(71) Applicant: Avago Technologies International Sales Pte. Limited, Singapore (SG)

(72) Inventors: Avinash Agarwal, Bangalore (IN); Mohit Sharma, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/416,077

(22) Filed: May 17, 2019

(65) Prior Publication Data
US 2019/0357148 A1 Nov. 21, 2019

Related U.S. Application Data

(60) Provisional application No. 62/672,961, filed on May 17, 2018.

(51) Int. Cl.
 *H04W 52/02* (2009.01)
 *H04W 4/38* (2018.01)

(52) U.S. Cl.
 CPC ......... *H04W 52/0287* (2013.01); *H04W 4/38* (2018.02)

(58) Field of Classification Search
 CPC .............................. H04W 4/38; H04W 52/0287
 USPC ..................... 331/161, 34; 318/471; 348/312; 345/173; 700/90
 See application file for complete search history.

(56) References Cited

U.S. PATENT DOCUMENTS

| | | | |
|---|---|---|---|
| 8,049,569 B1* | 11/2011 | Wright | H03L 7/104 331/161 |
| 2002/0191094 A1* | 12/2002 | Curtis | H03L 7/0812 348/312 |
| 2010/0117579 A1* | 5/2010 | Culbert | G06F 1/20 318/471 |
| 2010/0298957 A1* | 11/2010 | Sanchez Rocha | G05B 15/02 700/90 |
| 2014/0015763 A1* | 1/2014 | Woolley | G06F 3/0416 345/173 |
| 2014/0312981 A1* | 10/2014 | Nakamura | H03L 7/02 331/34 |
| 2016/0049207 A1* | 2/2016 | Gulati | G11C 17/16 365/96 |
| 2016/0346694 A1* | 12/2016 | Fisher | A63F 13/58 |
| 2017/0082651 A1* | 3/2017 | Liou | G01D 3/10 |
| 2017/0153121 A1* | 6/2017 | Hsu | G01C 25/00 |
| 2017/0153992 A1* | 6/2017 | Nair | G06F 1/1694 |
| 2017/0281012 A1* | 10/2017 | Kacelenga | A61B 5/0205 |
| 2017/0329386 A1* | 11/2017 | Winemiller | G06F 1/3237 |
| 2018/0091290 A1* | 3/2018 | Li | H04J 3/0638 |
| 2018/0143217 A1* | 5/2018 | Liou | G01R 33/0023 |
| 2019/0020433 A1* | 1/2019 | Pitigoi-Aron | G06F 1/12 |

(Continued)

*Primary Examiner* — Tan H Trinh
(74) *Attorney, Agent, or Firm* — Morgan, Lewis & Bockius LLP

(57) ABSTRACT

A system includes a frequency-locked loop (FLL) circuit, a sensor-hub circuit and a processor. The FLL circuit is used to generate a low-frequency clock. The sensor-hub circuit is coupled to a number of sensors and is configured to periodically poll the sensors during polling periods and to detect sensor activities. The processor is coupled to the sensor-hub circuit and can process sensor signals from one or more active sensors. The processor is off during polling periods and is turned on when a sensor activity is detected. The polling periods are based on the low-frequency clock generated by the FLL circuit.

20 Claims, 5 Drawing Sheets

(56) References Cited

U.S. PATENT DOCUMENTS

| | | | |
|---|---|---|---|
| 2019/0214976 A1* | 7/2019 | Wu | H03L 7/091 |
| 2019/0289543 A1* | 9/2019 | Kandasamy | H04W 72/0446 |
| 2019/0339762 A1* | 11/2019 | Mahler | G06F 1/04 |

* cited by examiner

ULTRALOW-POWER SENSOR HUBS

CROSS-REFERENCE TO RELATED APPLICATIONS

This application claims the benefit of priority under 35 U.S.C. § 119 from U.S. Provisional Patent Application 62/672,961 filed May 17, 2018, which is incorporated herein by reference in its entirety.

TECHNICAL FIELD

The present description relates in general to system level clock generation, and more particularly to, for example, without limitation, ultralow-power sensor hubs.

BACKGROUND

Traditional wearable devices activate quickly upon detection of any trigger, such as an event-like movement or voice command. In general, various sensors are populated in wearable devices, which can detect activity such as movement or a change in environment such as an ambient light, background noise or voice command. Many sensors have to be polled repetitively (e.g., every 50 ms) by a sensor hub in order to detect a trigger event. During the polling period, the sensor hub may check each sensor for activity detection. Once polling is done, if there was no activity detected on the sensors, the sensor hub returns back to sleep (e.g., retention state). The state of the sensor hub, however, can quickly change to an active state upon a trigger event. The processing of the signal from an active sensor is performed by a main central processor unit (MCU).

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to an ultralow-power sensor hub that can manage the operation of a number of sensors. The sensors are polled periodically (e.g., every 50 ms), and if a sensor activity is detected, a main central processing unit (MCU) may be triggered to handle the processing of the sensor signal. The sensor hub of the subject technology burns considerably low power while polling the sensors, as its clock signal is generated by a very low-power frequency-locked loop (FLL) that consumes a current of about 2 µA. Another low-power feature of the subject technology originates from the fact that during the polling periods the power-hungry MCU and its associated phase-locked loop (PLL) and crystal oscillator are in asleep state and only become active when the sensor hub detects a sensor activity.

Figure 1:
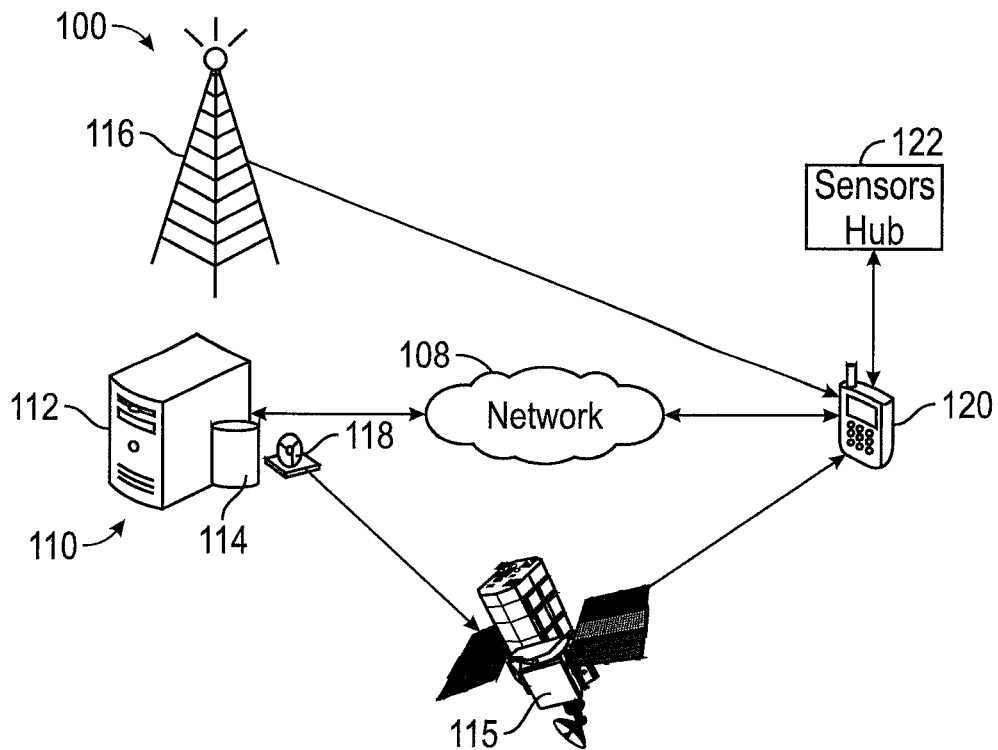
FIG. 1 illustrates a schematic diagram of a network environment within which the sensor hub of the subject technology operates.

FIG. 1 illustrates a schematic diagram of a network environment 100 within which the sensor hub 122 of the subject technology operates. The example network environment 100 includes a server 110, an electronic device 120, a network 108, a satellite 115 and an antenna 116. The server 110 is coupled to the electronic device 120 via network 108. The server 110 can use the antenna 116 for transmitting data over the air, for example, to the electronic device 120 and a satellite-transmitting device 118 for transmitting data to the satellite 115.

The electronic device 120 may include the sensor hub 122 and/or may be coupled to a satellite-receiving device (not shown), such as an antenna adaptor, that receives data from the satellite 115. In one or more implementations, the electronic device 120 may further include an antenna for receiving data streams, such as encoded video streams, over the air from the antenna 116 of the server 110. The network 108 may be a public communication network (such as the Internet, a cellular data network, dial-up modems over a telephone network) or a private communications network (such as private local area network (LAN), leased lines). Examples of the network 108 may also include, but are not limited to, any one or more of the following network topologies, including a bus network, a star network, a ring network, a mesh network, a star-bus network, a tree or hierarchical network, and the like. The server 110 may include, for example, a data server 112 that can include, or be coupled to, one or more processing devices, a data store 114, and/or an encoder to provide encoded data (e.g., encoded data streams such as video and/or audio streams). The one or more processing devices execute computer instructions stored in the data store 114, for example, to implement a content delivery network. The data store 114 may store the computer instructions on a nontransitory computer-readable medium. The data store 114 may further store one or more multimedia programs including video and/or audio streams that are delivered by the server 110.

The electronic device 120 may include one or more processing means, a memory, a radio frequency transceiver, and a display. In one or more implementations, examples of the electronic device 120 may include a wireless communication device such as a smartphone, a tablet device or a wearable electronic device such as a watch or a pair of glasses.

The electronic device 120 may receive data from the server 110 via the antenna 116, network 108, and/or satellite 115, and decode the encoded data streams, using the hardware decoder. The electronic device 120 may include a medium access control (MAC) layer and a physical (PHY) layer in accordance with an Institute of Electrical and Electronics Engineers (IEEE) 802.15.1 standard, such as Bluetooth (BT). In this example, the electronic device 120 may act as an access point (AP). In FIG. 1, the sensor hub 122 is shown to be in communication with the electronic device 120. In practice, however, the sensor hub 122 can be incorporated in the electronic device 120 along with a number of sensors that it controls or manages. The functionalities of the sensor hub 122 is described in more detail herein.

In some implementations, the electronic device 120 includes a single chip connectivity solution (e.g., fabricated on a single semiconductor die) for ultra-small battery-powered systems. The sensor hub 122 uses a low-power processor and an inter-integrated circuit (I2C) interface to control and transfer data from/to external sensors.

Figure 2:
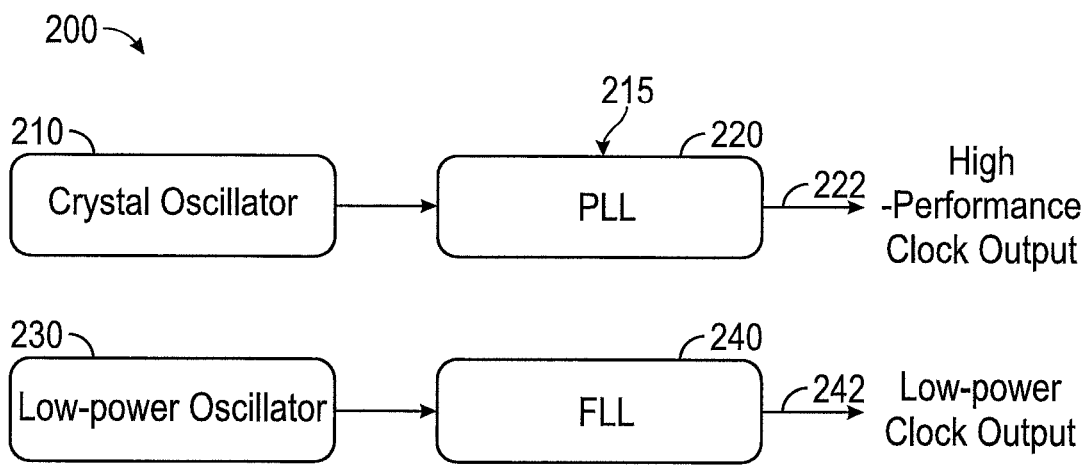
FIG. 2 is a high-level diagram illustrating an example of a clock connectivity and control circuit, in accordance with one or more aspects of the subject technology.

FIG. 2 is a high-level diagram illustrating an example of clock connectivity and control circuit 200, in accordance with one or more aspects of the subject technology. The clock connectivity and control circuit 200 includes a crystal oscillator 210, a PLL 220, a low-power oscillator 230 and an FLL 240. The crystal oscillator 210 provides the reference clock for the PLL 220. The crystal oscillator 210 is a 24 MHz crystal oscillator. In one or more implementations, other crystal oscillators such as 37.4 MHz and 59.97 MHz crystals can be used as the reference clock for the PLL 220. The PLL 220 receives a clock multiplication factor 215, by which the frequency of the reference clock is multiplied. The PLL provides a high-performance clock output 222 that is a highly accurate clock and is provided to the MCU. The FLL 240 is a low-power FLL and receives its reference clock from the low-power oscillator 230 and provides a low-power clock output 242 for the sensor hub. The disclosed solution shuts down the crystal oscillator 210, the PLL 220 and the MCU (not shown in FIG. 2) during polling periods, and instead uses the low-power clock output 242 of the FLL 240 to poll for the activities from the sensors. The low-power FLL 240 generates the low-power clock output 242 at a frequency of about 1 MHz and is always running in the chip for various on-chip timers. Current consumed by low-power FLL 240 can be as low as about 2 µA, while generating 1 MHz output clock signal. The reference clock for the FLL 240 is a 32 KHz clock signal, which is always available and can also be used for on-chip timers. The 32 KHz clock signal can be generated by a dedicated 32 KHz crystal or a shared 32 KHz crystal present in the host device (e.g., the electronic device 120 of FIG. 1). The low-power oscillator 230 can consume a small current in the order of a few hundreds of nanoamperes (nA) (e.g., 300 nA). When a sensor activity is detected by the sensor hub (e.g., 122 of FIG. 1), the crystal oscillator 210 and the PLL 220 are switched on for the MCU to process the signals of the one or more active sensors.

Figure 3:
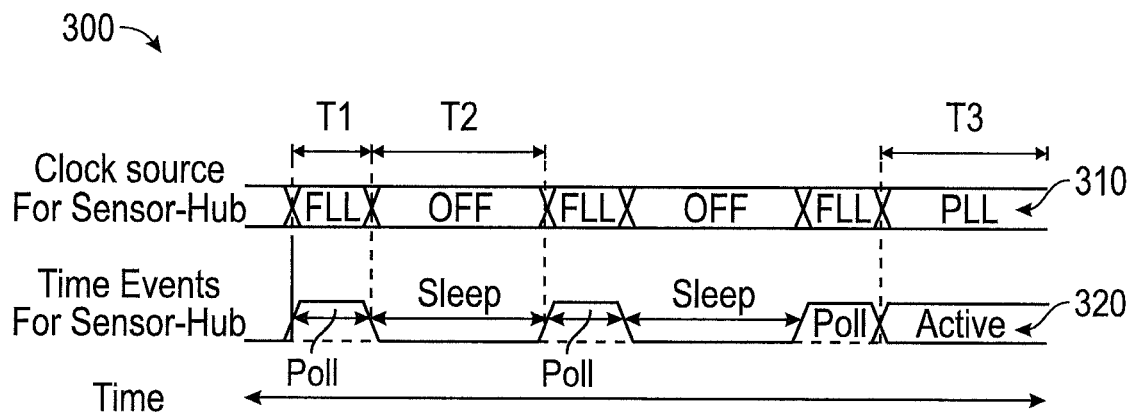
FIG. 3 is a time diagram illustrating an example of poll periods and sleep periods for the sensor hub of the subject technology.

FIG. 3 is a time diagram 300 illustrating an example of poll periods (T1) and sleep periods (T2) for the sensor hub of the subject technology. The time diagram 300 includes clock-source plots 310 and time-event plots 320. The clock-source plots 310 indicate FLL (e.g., 240 of FIG. 2) on and off periods. The time-event plots 320 depict the poll periods T1 and sleep periods T2. During the poll periods T1, the FLL 240 is in an active state and during the sleep periods T2, the FLL 240 is in a sleep state. The MCU and the corresponding high-power crystal oscillator (e.g., 210 of FIG. 2) and PLL (e.g., 220 of FIG. 2) are off for most of the time and only switch on during active periods T3.

It is understood that generation of the high-performance clock output 222 demands high-power consumption (due to significant static currents of the crystal oscillator 210 and the PLL 220), which adds up to the use-case power if they are always kept on. The subject solution, advantageously switches these components off during the polling periods T1 and sleep periods T2 (retention state), and only switches them on for sensor activity analysis. It is noted, however, that if the crystal oscillator 210 and the PLL 220 were used for polling the sensors (as used in existing solutions) instead of the FLL, there could be a large latency (e.g., about 1 ms for crystal oscillator and about 0.5 ms for the PLL) while the sensor hub was coming out of the retention state. Such a latency could adversely affect system performance.

Figure 4:
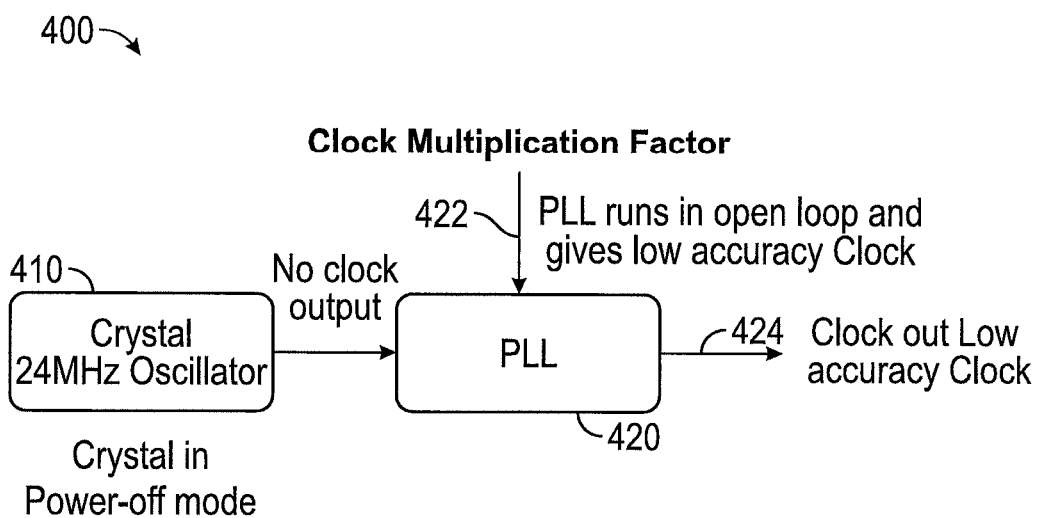
FIG. 4 is a block diagram illustrating an example operation scheme of a phase-locked loop of the subject technology operating in open-loop mode.

FIG. 4 is a block diagram illustrating an example operation scheme 400 of a PLL of the subject technology operating in open-loop mode. In the operation scheme 400, the crystal 410 (e.g., 24 MHz crystal) is powered off and the PLL 420 is operating in an open-loop mode based on the clock multiplication factor 422. The scheme provides for additional power saving, but at the expense of providing a low-accuracy clock (424). After accounting for the clock frequency uncertainty, PLL clock output in open-loop mode will be mostly on the slower side (roughly about 50% lower) than PLL clock output in closed-loop mode. Running the sensor hub and the MCU on this low-accuracy slower clock can increase the processing time to service various activities from sensors. This results in the system being active (out of sleep state) for a longer time duration due to slower open-loop PLL clock, which can lead to more energy dissipation due to static power dissipated in active state (not in sleep state) for a longer time.

Figure 5:
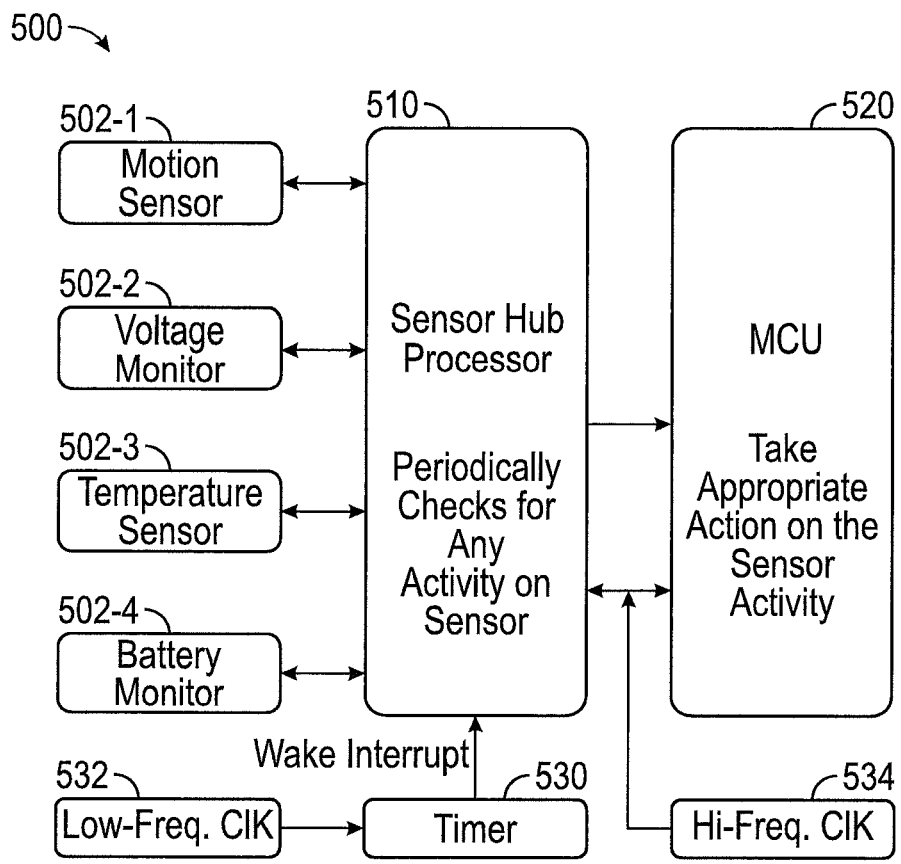
FIG. 5 is a block diagram illustrating an example of a low-power sensor management system, in accordance with one or more aspects of the subject technology.

FIG. 5 is a block diagram illustrating an example of a low-power sensor management system 500, in accordance with one or more aspects of the subject technology. The low-power sensor management system 500 includes sensors 502, a sensor hub 510 (also referred to as sensor-hub processor), an MCU 520 and a timer 530. The sensors 502 can include a number of sensors such as a motion sensor 502-1, a voltage monitor 502-2, a temperature sensor 502-3 and a battery monitor 502-4, but is not limited to these sensors and can include other sensors. In one or more implementations, the sensors 502, the sensor hub 510, the MCU 520 and the timer 530 can be realized on a single chip. The chip can be incorporated in a host electronic device, such as the electronic device 120 of FIG. 1, which can be a handheld or wearable wireless communication device (e.g., a smartphone or a smartwatch). In some implementations, the MCU 520 can be a processor of the host device.

The sensor hub 510 is in communication with sensors 502 and can periodically poll (e.g., during polling periods T1 of FIG. 3) the sensor 502, and when a sensor activity by one or more sensors 502 is detected, the sensor hub 510 can send a wake-up signal to the MCU 520. The sensor hub 510 can also send sensor activity data to the MCU 520. The sensor hub 510 switches to a sleep mode after finishing a round of polling the sensors 502 and is woken up by a wake-up interrupt from the timer 530. The MCU 520 is responsible for processing the activity data from the sensors 502. For example, the MCU 520 can analyze the sensor data of an active sensor for one or more applications (e.g., a health application) that depends on data from that sensor. The timer 530 may use a low-frequency clock 532 (e.g., from FLL 240 of FIG. 2), and the MCU 520 can operate based on a high-frequency clock 534, for example, generated by the PLL 220 of FIG. 2.

Figure 6:
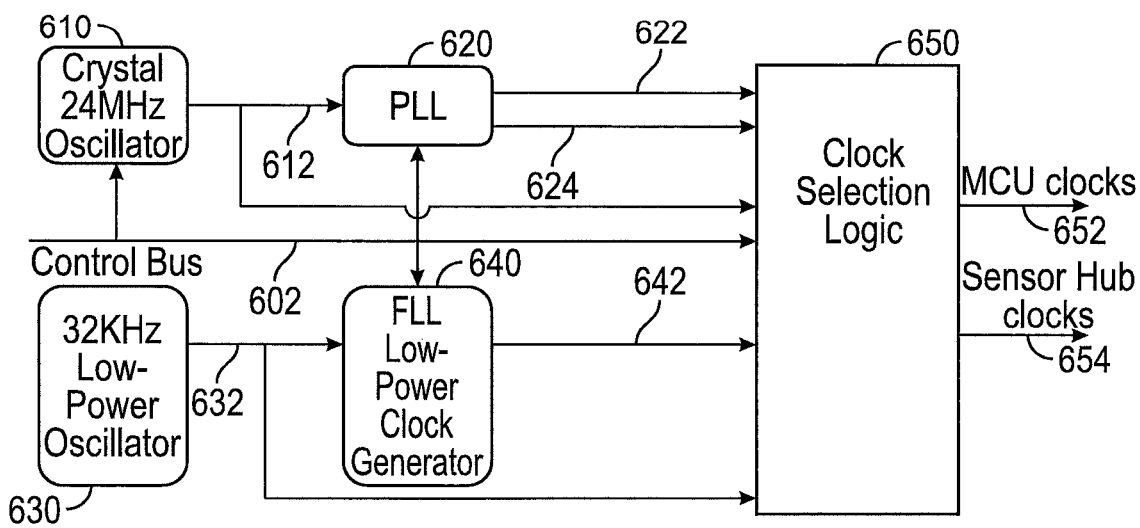
FIG. 6 is a block diagram illustrating an example of a clock selection and control circuit, in accordance with one or more aspects of the subject technology.

FIG. 6 is a block diagram illustrating an example of a clock selection and control circuit 600, in accordance with one or more aspects of the subject technology. The clock selection and control circuit 600 includes a crystal oscillator 610, a PLL 620, a low-power oscillator 630, an FLL 640 and a clock selection logic 650. The crystal oscillator 610 generates a clock signal 612 at about 24 GHz that is then fed to the PLL 620 and the clock selection logic 650. The PLL 620 uses the clock signal 612 as its reference clock and provides a PLL clock signal 622 and an open-loop clock signal 624 to the clock selection logic 650. The open-loop clock signal 624, as described above, is less accurate than the PLL clock signal 622, which is a high-performance clock.

The low-power oscillator 630 generates a low-frequency clock signal 632 with a frequency of about 32 KHz. The FLL 640 uses the low-frequency clock signal 632 as its reference clock to generate a low-power clock signal 642 for the clock selection logic 650. The low-power clock signal 642 is also directly provided to the clock selection logic 650 by the low-power oscillator 630. The clock selection logic 650 includes suitable circuitry and code to generate MCU clock signal 652 and the sensor hub clock signal 654 based on the clock signals received from the PLL 620 and the FLL 640, the clock signal 612 and the low-frequency clock signal 632. A control bus 602 handles transmission of control signals between the crystal oscillator 610, PLL 620, FLL 640 and the clock selection logic 650.

Figure 7:
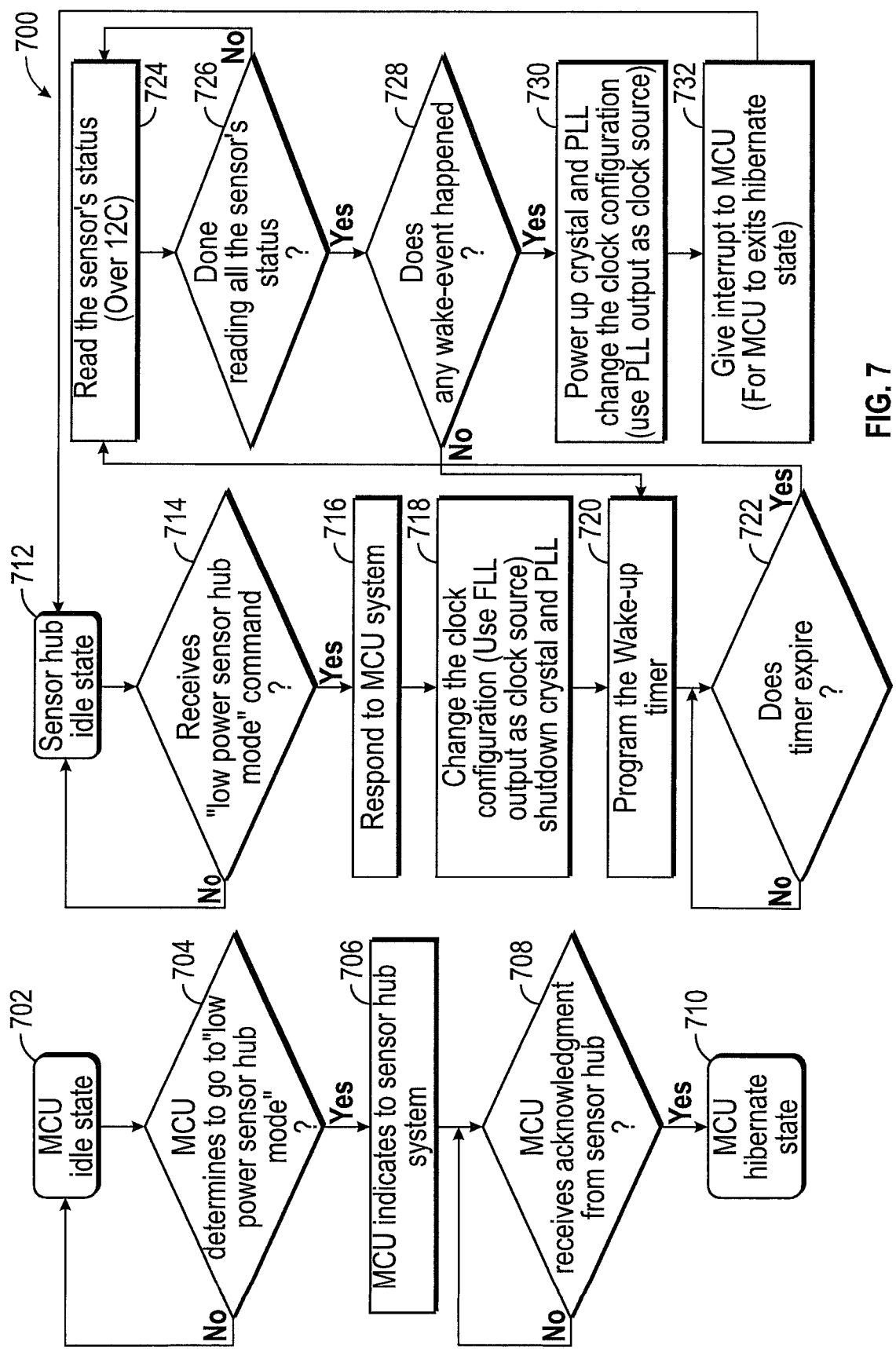
FIG. 7 is a flow diagram illustrating an example of an algorithm for operation of the low-power sensor management system of the subject technology.

FIG. 7 is a flow diagram illustrating an example of an algorithm 700 for operation of the low-power sensor management system of the subject technology. The algorithm 700 begins at operation block 702 where the MCU (e.g., 520 of FIG. 5) is in an idle state. At control block 704, the MCU determines whether it should move to a low-power sensor hub mode. If the answer is no, the MCU goes back to the idle state. In the idle state, the MCU is ready for processing sensor data. Otherwise, if it determines that it should change states, at operation block 706 the MCU indicates to the sensor hub (e.g., 510 of FIG. 5) its intention to change state. At control block 708, if the MCU receives an acknowledgement from the sensor hub, at operation block 710 it will switch to hibernate state. Otherwise, if the MCU does not receive the acknowledgement from the sensor hub, the MCU will wait for the acknowledgment. At operation block 712, the sensor hub is in an idle state. At control block 714, the sensor hub checks to see if a low-power sensor hub mode command is received from the MCU. If the answer is no, the sensor hub continues in the idle state. Otherwise, if the low-power sensor hub mode command is received from the MCU, the sensor hub, at operation block 716, responds to the MCU, and at operation block 718, changes its clock configuration. The sensor hub changes its clock configuration by using the output clock signal (e.g., 642 of FIG. 6) from the FLL (e.g., 640 of FIG. 6) as its clock source. The sensor hub further shuts down the crystal oscillator (e.g., 610 of FIG. 6) and the PLL (e.g., 640 of FIG. 6) to save power.

At operation block 720, the sensor hub programs the wake-up timer (e.g., timer 530 of FIG. 5). At control block 722, the sensor hub checks to see if the timer has expired, and if the timer is not expired, the sensor hub keeps checking. Otherwise, if the timer is expired, at operation block 724 the sensor hub reads the status of the sensors (e.g., 502 of FIG. 5) to see if there is any activity by one or more of the sensors. The sensor hub can check the status of the sensors via, for example, an I2C interface. At control block 726, it is checked whether the statuses of all sensors have been read. If there are sensors with statuses indicating "still not read", control is passed back to operation block 724. Otherwise, if the status of all sensors are read, at control block 728, it is checked whether any wake-up event occurred. If no wake-up event occurred, control is passed to operation block 720. Otherwise, if a wake-up event occurred, at operation block 730 crystal oscillator (e.g., 610 of FIG. 6) and the PLL are powered up and the sensor hub clock configuration is changed by using the clock signal generated by the PLL (e.g., 624 of FIG. 6) as the clock source for the sensor hub. Finally, at operation block 732, an interrupt signal is sent to the MCU to exit from the hibernate mode, and control is passed to operation block 712, where the sensor hub returns to the idle state.

Figure 8:
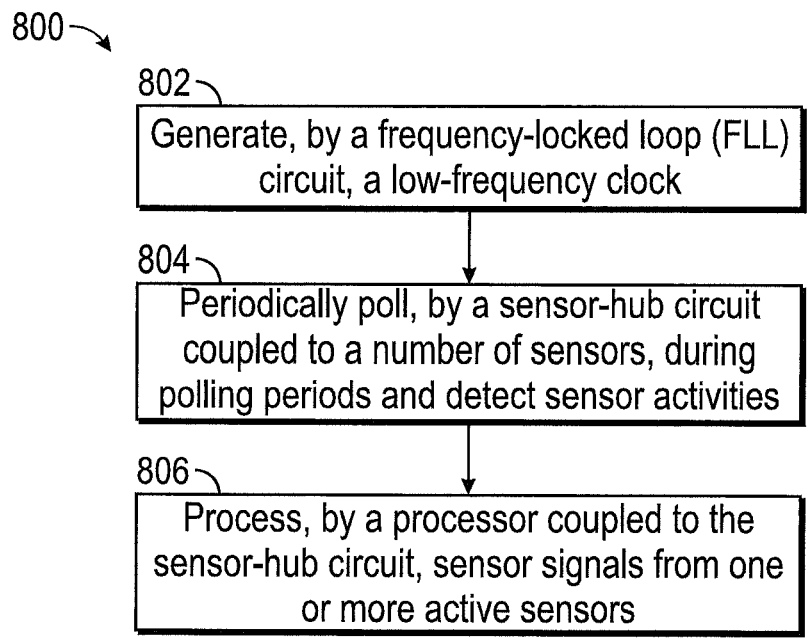
FIG. 8 is a flow diagram illustrating an example of a method of the low-power sensor management, in accordance with one or more aspects of the subject technology.

FIG. 8 is a flow diagram illustrating an example of a method 800 of low-power sensor management, in accordance with one or more aspects of the subject technology. The method 800 starts with a frequency-locked loop (FLL) circuit (e.g., 240 of FIG. 2) generating a low-frequency clock (e.g., 242 of FIG. 2) (802). A sensor-hub circuit (e.g., 510 of FIG. 5) periodically polls a number of sensors (e.g., 502 of FIG. 5) during polling periods (e.g., T1 of FIG. 3) and detects sensor activities (804). A processor (e.g., 520 of FIG. 5) coupled to the sensor hub circuit processes sensor signals from one or more active sensors (806).

Figure 9:
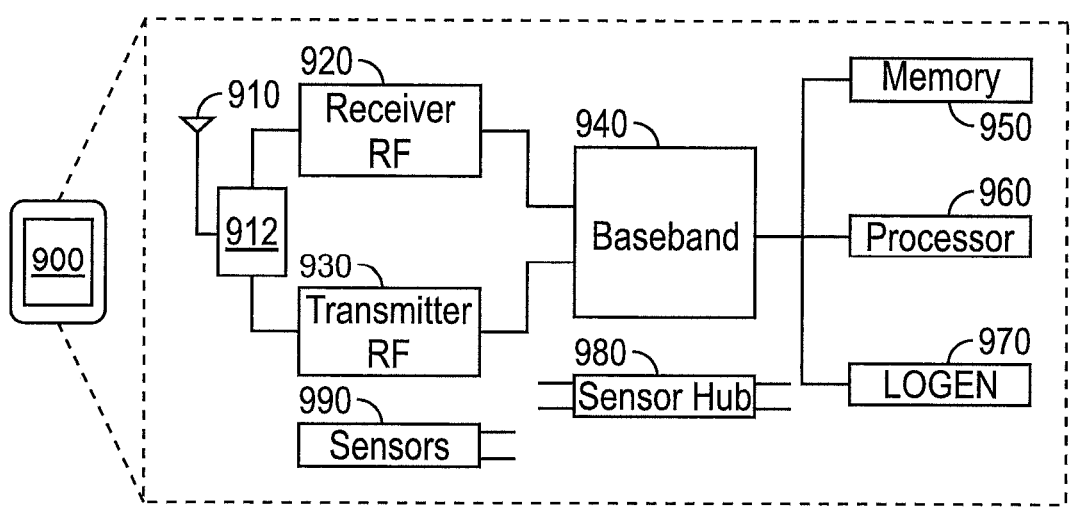
FIG. 9 conceptually illustrates an example of a wireless commutation device within which the sensor hub of the subject technology is implemented.

FIG. 9 conceptually illustrates an example of a wireless communication device 900 within which the sensor hub of the subject technology is implemented. The wireless communication device 900 may comprise a radio-frequency (RF) antenna 910, a duplex 912 a receiver 920, a transmitter 930, a baseband processing module 940, a memory 950, a processor 960, a local oscillator generator (LOGEN) 970, a sensor hub 980 and sensors 990. In various embodiments of the subject technology, one or more of the blocks represented in FIG. 9 may be integrated on one or more semiconductor substrates. For example, the blocks 920-970 may be realized in a single chip or a single system on a chip, or may be realized in a multichip chipset.

The RF antenna 910 may be suitable for transmitting and/or receiving RF signals (e.g., wireless signals) over a wide range of frequencies (e.g., 60 GHz band). Although a single RF antenna 910 is illustrated, the subject technology is not so limited.

The receiver 920 may comprise suitable logic circuitry and/or code that may be operable to receive and process signals from the RF antenna 910. The receiver 920 may, for example, be operable to amplify and/or down-convert received wireless signals. In various embodiments of the subject technology, the receiver 920 may be operable to cancel noise in received signals and may be in close proximity to a wide range of frequencies. In this manner, the receiver 920 may be suitable for receiving signals in accordance with a variety of wireless standards, including Wi-Fi, WiMAX, Bluetooth, and various cellular standards. In various embodiments of the subject technology, the receiver 920 may not require any surface acoustic wave (SAW) filters and few or no off-chip discrete components such as large capacitors and inductors.

The transmitter 930 may comprise suitable logic circuitry and/or code that may be operable to process and transmit signals from the RF antenna 910. The transmitter 930 may, for example, be operable to up-convert baseband signals to RF signals and amplify RF signals. In various embodiments of the subject technology, the transmitter 930 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 930 may be operable to provide signals for further amplification by one or more power amplifiers.

The duplexer 912 may provide isolation in the transmit band to avoid saturation of the receiver 920 or damaging parts of the receiver 920, and to relax one or more design requirements of the receiver 920. Furthermore, the duplexer 912 may attenuate the noise in the receive band. The duplexer may be operable in multiple frequency bands of various wireless standards.

The baseband processing module 940 may comprise suitable logic, circuitry, interfaces, and/or code that may be operable to perform processing of baseband signals. The baseband processing module 940 may, for example, analyze received signals and generate control and/or feedback signals for configuring various components of the wireless communication device 900 such as the receiver 920. The baseband processing module 940 may be operable to encode, decode, transcode, modulate, demodulate, encrypt, decrypt, scramble, descramble, and/or otherwise process data in accordance with one or more wireless standards.

The processor 960 may comprise suitable logic, circuitry, and/or code that may enable the processing of data and/or controlling of operations of the wireless communication device 900. In this regard, the processor 960 may be enabled to provide control signals to various other portions of the wireless communication device 900. The processor 960 may also control transfers of data between various portions of the wireless communication device 900. Additionally, the processor 960 may enable implementation of an operating system or otherwise execute code to manage operations of the wireless communication device 900. In some implementations, the processor 960 may perform the functionalities of the MCU 520 of FIG. 5.

The memory 950 may comprise suitable logic, circuitry, and/or code that may enable storage of various types of information such as received data, generated data, code, and/or configuration information. The memory 950 may comprise, for example, RAM, ROM, flash, and/or magnetic storage. In various embodiments of the subject technology, information stored in the memory 950 may be utilized for configuring the receiver 920 and/or the baseband processing module 940.

The local oscillator generator (LOGEN) 970 may comprise suitable logic, circuitry, interfaces, and/or code that may be operable to generate one or more oscillating signals of one or more frequencies. The LOGEN 970 may be operable to generate digital and/or analog signals. In this manner, the LOGEN 970 may be operable to generate one or more clock signals and/or sinusoidal signals. Characteristics of the oscillating signals such as the frequency and duty cycle may be determined based on one or more control signals from, for example, the processor 960 and/or the baseband processing module 940.

In operation, the processor 960 may configure the various components of the wireless communication device 900 based on a wireless standard according to which it is desired to receive signals. Wireless signals may be received via the RF antenna 910 and amplified and down-converted by the receiver 920. The baseband processing module 940 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 950, and/or information affecting and/or enabling operation of the wireless communication device 900. The baseband processing module 940 may modulate, encode and perform other processing on audio, video, and/or control signals to be transmitted by the transmitter 930 in accordance with various wireless standards.

In some implementations, the sensor hub 980 can be a sensor hub (e.g., 510) of the subject technology as discussed above with respect to FIG. 5. The sensor hub 980 can be an ultralow-power sensor hub and can manage the operation of a number of sensors 990 that are also incorporated in the wireless communication device 900. In some implementations, the sensor hub 980 may also manage sensors not incorporated in the wireless communication device 900 via a network (e.g., 108 of FIG. 1).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A system comprising:
    a frequency-locked loop (FLL) circuit configured to generate a low-frequency clock;
    a sensor-hub circuit coupled to a plurality of sensors and configured to periodically poll the plurality of sensors during polling periods to detect sensor activities; and
    a processor coupled to the sensor-hub circuit and configured to process sensor signals from one or more active sensors,
    wherein the processor is off during polling periods and is turned on when a sensor activity is detected, and the polling periods during which the sensor-hub circuit polls the plurality of sensors are based on the low-frequency clock generated by the FLL circuit.

2. The system of claim 1, further comprising a low-power and low-frequency oscillator configured to operate at a low current of about a few hundred nanoamperes (nA) and to generate a low-frequency clock signal at a frequency of about a few tens of KHz.

3. The system of claim 2, wherein the FLL circuit is configured to use the low-frequency clock signal of the low-power and low-frequency oscillator as an FLL reference clock.

4. The system of claim 2, wherein the low-power and low-frequency oscillator is always available and is used as a reference clock for one or more on-chip timers.

5. The system of claim 1, wherein the FLL circuit comprises a low-power FLL operating at a current of about a few microamperes (μA) and is configured to generate an output clock signal of about 1 MHz.

6. The system of claim 1, wherein the processor is configured to use a reference clock generated by a phase-locked loop (PLL) circuit that operates based on a high-frequency crystal with a frequency of a few MHz.

7. The system of claim 6, wherein the high-frequency crystal comprises one of a 24 MHz, 37.4 MHz or 59.97 MHz crystal.

8. The system of claim 6, wherein the high-frequency crystal comprises a 24 MHz crystal and is used as a processor reference clock, and the PLL circuit is turned off.

9. The system of claim 6, wherein the sensor-hub circuit is configured to turn on the PLL circuit and the high-frequency crystal upon detecting the sensor activities.

10. The system of claim 6, wherein the PLL circuit is configured to operate in an open-loop mode, while the high-frequency crystal is turned off to save power.

11. The system of claim 6, wherein the PLL circuit and the high-frequency crystal are turned off during the polling periods to save power and are turned on when the sensor activity is detected.

12. The system of claim 1, wherein the sensor-hub circuit is configured to be active during polling periods and to be in a sleep state during time intervals between the polling periods.

13. The system of claim 10, wherein the plurality of sensors comprise one or more temperature sensors, pressure sensors, motion sensors, voltage monitors, and battery monitors.

14. A method of low-power management of a plurality of sensors, the method comprising:
    generating, by a FLL circuit, a low-frequency clock;
    periodically polling, by a sensor-hub circuit coupled to the plurality of sensors, during polling periods and detecting sensor activities; and
    processing, by a processor coupled to the sensor-hub circuit, sensor signals from one or more active sensors,
    wherein the processor is off during polling periods and is turned on when a sensor activity is detected, and the polling periods during which the sensor-hub circuit polls the plurality of sensors are based on the low-frequency clock generated by the FLL circuit.

15. The method of claim 14, further comprising operating a low-power and low-frequency oscillator at a low current of about a few hundred nanoamperes (nA) to generate a low-frequency clock signal at a frequency of about a few tens of KHz.

16. The method of claim 14, further comprising operating the FLL circuit to generate an output clock signal of about 1 MHz, wherein the FLL circuit comprises a low-power FLL operating at a current of about a few microamperes (μA).

17. The method of claim 14, wherein the processor comprises a phase-locked loop (PLL) circuit generating a reference clock based on a high-frequency crystal with a frequency of a few MHz.

18. The method of claim 17, further comprising turning on, by the sensor-hub circuit, the PLL circuit and the high-frequency crystal upon detecting the sensor activities.

19. A wireless communication device, the device comprising:
    a plurality of sensors;
    a sensor-hub circuit coupled to the plurality of sensors and configured to periodically poll the plurality of sensors during polling periods and to detect sensor activities;

a processor coupled to the sensor-hub circuit and configured to process sensor signals from one or more active sensors, the processor being off during polling periods and being turned on when a sensor activity is detected; and a frequency-locked loop (FLL) circuit configured to generate a low-frequency clock, wherein the polling periods during which the sensor-hub circuit polls the plurality of sensors are based on the low-frequency clock generated by the FLL circuit.

20. The device of claim 19, further comprising a low-power and low-frequency oscillator configured to operate at a low current of about a few hundred nanoamperes (nA) and to generate a low-frequency clock signal at a frequency of about a few tens of KHz, wherein the FLL circuit is configured to use the low-frequency clock signal of the low-power and low-frequency oscillator as an FLL reference clock, and wherein the low-power and low-frequency oscillator is always available and is used as a reference clock for one or more on-chip timers.

* * * * *